US008085832B2

(12) United States Patent
Pan et al.

(10) Patent No.: US 8,085,832 B2
(45) Date of Patent: Dec. 27, 2011

(54) SEGMENT-WISE CHANNEL EQUALIZATION BASED DATA ESTIMATION

(75) Inventors: Kyle Jung-Lin Pan, Smithtown, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 275 days.

(21) Appl. No.: 12/555,307

(22) Filed: Sep. 8, 2009

(65) Prior Publication Data

US 2009/0323769 A1    Dec. 31, 2009

Related U.S. Application Data

(63) Continuation of application No. 12/277,918, filed on Nov. 25, 2008, now Pat. No. 7,609,750, which is a continuation of application No. 10/878,742, filed on Jun. 28, 2004, now Pat. No. 7,460,580, which is a continuation of application No. 10/153,112, filed on May 22, 2002, now Pat. No. 6,757,321.

(51) Int. Cl.
*H04B 1/00* (2006.01)

(52) U.S. Cl. ........ 375/141; 375/148; 375/260; 375/340; 370/479

(58) Field of Classification Search .................. 375/140, 375/141, 144, 147, 148, 260, 316, 340; 370/320, 370/321, 335, 336, 342, 347, 441, 442, 464, 370/479
See application file for complete search history.

(56) References Cited

U.S. PATENT DOCUMENTS

| 5,373,507 | A | 12/1994 | Skold |
| 5,414,699 | A | 5/1995 | Lee |
| 5,533,066 | A | 7/1996 | Yamaguchi et al. |
| 5,796,776 | A | 8/1998 | Lomp et al. |
| 5,933,423 | A | 8/1999 | Laakso |
| 6,075,808 | A | 6/2000 | Tsujimoto |
| 6,144,711 | A | 11/2000 | Raleigh et al. |
| 6,208,295 | B1 | 3/2001 | Dogan et al. |
| 6,208,684 | B1 | 3/2001 | Yellin et al. |
| 6,252,540 | B1 | 6/2001 | Hale et al. |
| 6,256,336 | B1 | 7/2001 | Rademacher |
| 6,370,129 | B1 | 4/2002 | Huang |
| 6,370,397 | B1 | 4/2002 | Popovic et al. |
| 6,426,983 | B1 | 7/2002 | Rakib et al. |
| 6,470,000 | B1 | 10/2002 | Burns et al. |
| 6,480,522 | B1 | 11/2002 | Hoole et al. |
| 6,501,747 | B1 | 12/2002 | Friedlander et al. |
| 6,707,864 | B2 | 3/2004 | Kim |

(Continued)

FOREIGN PATENT DOCUMENTS

DE    196 16 828    11/1997

(Continued)

OTHER PUBLICATIONS

"Low Cost MMSE-BLE-SD Algorithm for UTRA TDD Mode Downlink", PA Consulting Group/Racal Instruments Ltd., ETSI STC SMG2 Layer 1 Expert Group, Helsinki, Finland, Sep. 8-11, 1998.

(Continued)

*Primary Examiner* — Dac Ha
(74) *Attorney, Agent, or Firm* — Volpe and Koenig, P.C.

(57) ABSTRACT

Data is estimated of a plurality of received spread spectrum signals by a wireless communication apparatus. The plurality of received communications are received in a shared spectrum. The received communications are sampled to produce a received vector of sequential samples. The received vector is processed to produce a plurality of segments. Each segment is processed separately to estimate data of the received communications.

20 Claims, 2 Drawing Sheets

U.S. PATENT DOCUMENTS

| | | | |
|---|---|---|---|
| 7,012,909 | B2 | 3/2006 | Tanno et al. |
| 7,430,257 | B1 | 9/2008 | Shattil |
| 2001/0048674 | A1 | 12/2001 | Cho et al. |
| 2002/0018454 | A1 | 2/2002 | Misra et al. |
| 2002/0051433 | A1 | 5/2002 | Affes et al. |
| 2004/0082356 | A1 | 4/2004 | Walton et al. |
| 2004/0086027 | A1 | 5/2004 | Shattil |

FOREIGN PATENT DOCUMENTS

| | | |
|---|---|---|
| JP | 2001-274730 | 10/2001 |
| JP | 2002-330114 | 11/2002 |
| JP | 2003-110474 | 4/2003 |
| JP | 2003-244022 | 8/2003 |
| TW | 421928 | 2/2001 |
| WO | 95/04413 | 2/1995 |
| WO | 00/77942 | 12/2000 |
| WO | 01/20801 | 3/2001 |
| WO | 01/69801 | 9/2001 |
| WO | 02/089346 | 11/2002 |

OTHER PUBLICATIONS

Chen, "Reduced-Dimension Blind Space-Time 2-D Rake Receivers for DS-CDMA Communication Systems", IEEE Transactions on Signal Processing, vol. 48, No. 6, pp. 1521-1536, (Jun. 2000).

Dmochowski et al., "Frequency Domain Equalization for High Data Rate Multipath Channels," 2001 IEEE Pacific Rim Conference on Communications, Computers and Signal Processing, vol. 2, pp. 534-537, 2001.

Haykin, "Adaptive Filter Theory", Third Edition, Prentice Hall, 1996, pp. 87-93.

Karimi et al., "A Novel and Efficient Solution to Block-Based Joint-Detection Using Approximate Cholesky factorization", Motorola GSM Products Division, Swindon, UK, 1998.

Kärkkäinen et al., "Performance of an Asynchronous DS-CDMA System with Long and Short Spreading Codes—A Simulation Study", Military Communications Conference, 1994., MILCOM '94, Conference Record, 1994 IEEE, Vo. 3, pp. 780-784, (Oct. 2-5, 1994).

Klein et al., "Linear Unbiased Data Estimation in Mobile Radio Systems Applying CDMA", IEEE Journal on Selected Areas in Communications, vol. 11, No. 7, Sep. 1993.

Klein et al., "Zero Forcing and Minimum Mean-Square-Error Equalizer for Multiuser Detection in Code-Division Multiple-Access Channels", IEEE Transactions on Vehicular Technology, vol. 45, No. 2, May 1996.

Klein, "Data Detection Algorithms Specially Designed for the Downlink of CDMA Mobile Radio Systems", IEEE $47^{th}$ Vehicular Technology Conference, Phoenix, Arizona, USA, May 4-7, 1997.

Misra et al., "A Computationally Efficient Hybrid Joint Detection and Successive Interference Cancellation", VTC 2001 Spring. IEEE VTS $53^{rd}$. Vehicular Technology Conference. vol. 3 of 4. Conf 53. May 6, 2001 pp. 1784-1788, XP001082450, ISBN: 0-7803-6728-6.

Pan et al., "Low Complexity Data Detection Using Fast Fourier Transform Decomposition of Channel Correlation Matrix", Globecom'01 IEEE Global Telecommunications Conference, San Antonio, TX Nov. 25-29, 2001, vol. 2 of 6 pp. 1322-1326, XP001099319, ISBN: 0-7803-7206-9.

Tsai et al., "Hybrid MMSE and SIC for Multiuser Detection", VTC 2001 Spring. IEEE VTS $53^{rd}$. Vehicular Technology Conference. vol. 3 of 4. Conf 53. May 6, 2001 pp. 1779-1783, XP001082449, ISBN: 0-7803-6728-6.

Tsatsanis et al., "Adaptive blind interference cancellation in CDMA systems", Seamless Interconnection for Universal Services; Global Telecommunications Conference, Globecom '99 (Cat. No. 99CH37042);. pp. 487-491 vol. 1a; XP000958336 1999, Piscataway, NJ, USA, IEEE, USA ISBN: 0-7803-5796-5.

Vollmer et al., "Comparative Study of Joint-Detection Techniques for TD-CDMA Based Mobile Radio Systems", IEEE Journal on Selected Areas in Communications, vol. 19, No. 8, Aug. 2001, pp. 1461-1475.

Wu et al., Lower-Complexity Direct Symbol Detector for Multiuser MC-CDMA System Using Antenna Array without Vector Channel Estimation, IEEE International Symposium on Circuits and Systems, 2002., ISCAS 2002, vol. 5, pp. V-2-V-8, (May 26-29, 2002).

Zhao et al., "Reduced-Dimension Multiuser Detection Based on Grouping Users and Reducing Effective Length of Spread Spectrum Code in CDMA Systems", IEEE International Symposium on Circuits and Systems, 2002., ISCAS 2002, Vo. 1, pp. I-689-I-692, (May 26-29, 2002).

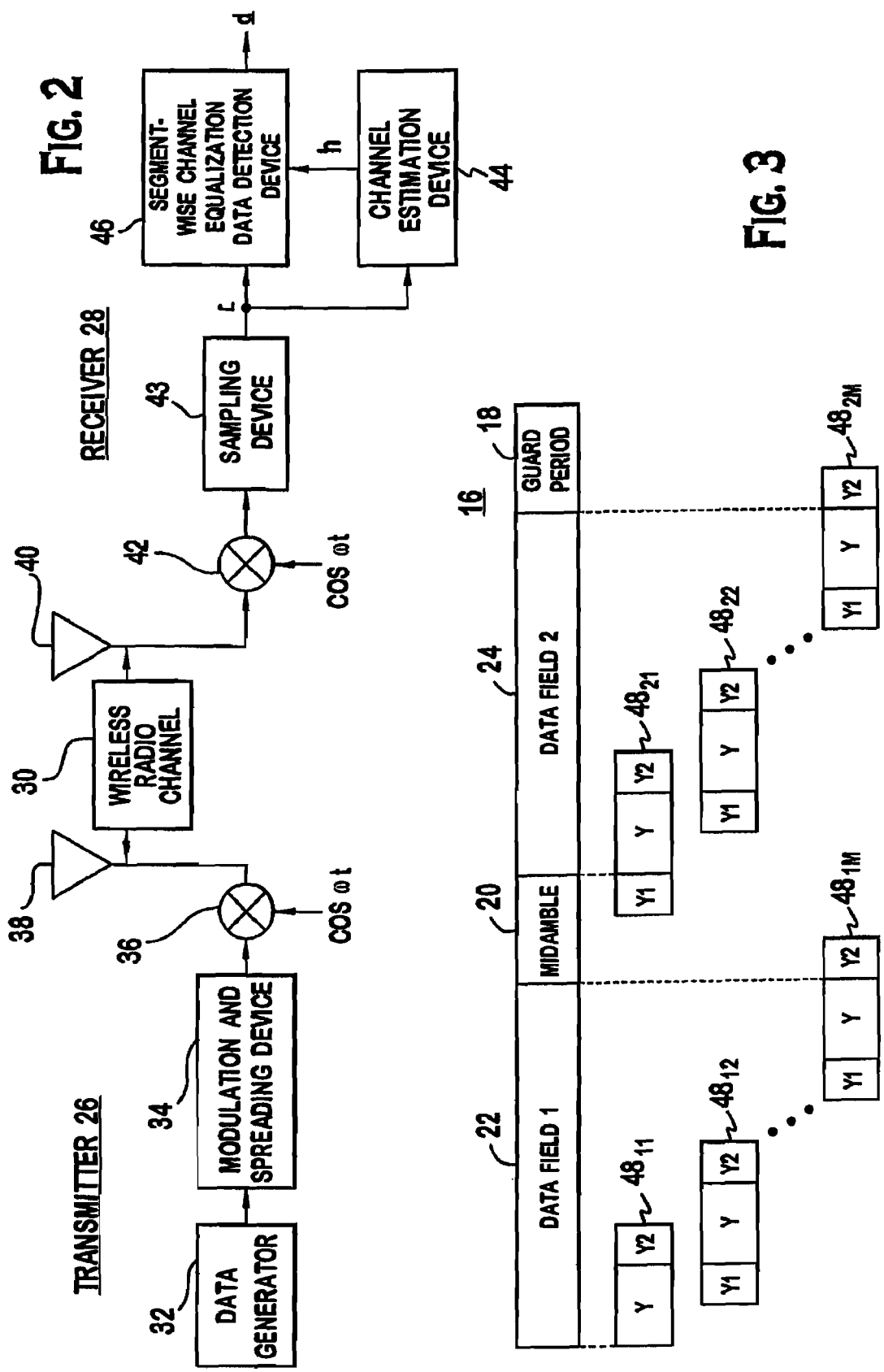

US 8,085,832 B2

SEGMENT-WISE CHANNEL EQUALIZATION BASED DATA ESTIMATION

CROSS REFERENCE TO RELATED APPLICATION(S)

This application is a continuation of U.S. patent application Ser. No. 12/277,918, filed Nov. 25, 2008, which is a continuation of U.S. patent application Ser. No. 10/878,742, filed Jun. 28, 2004, now U.S. Pat. No. 7,460,580, which is a continuation of U.S. patent application Ser. No. 10/153,112, filed May 22, 2002, now U.S. Pat. No. 6,757,321, which are all incorporated by reference as if fully set forth

BACKGROUND

The invention generally relates to wireless communication systems. In particular, the invention relates to data detection in a wireless communication system.

FIG. 1 is an illustration of a wireless communication system 10. The communication system 10 has base stations $12_1$ to $12_5$ (12) which communicate with user equipments (UEs) $14_1$ to $14_3$ (14). Each base station 12 has an associated operational area, where it communicates with UEs 14 in its operational area.

In some communication systems, such as code division multiple access (CDMA) and time division duplex using code division multiple access (TDD/CDMA), multiple communications are sent over the same frequency spectrum. These communications are differentiated by their channelization codes. To more efficiently use the frequency spectrum, TDD/CDMA communication systems use repeating frames divided into time slots for communication. A communication sent in such a system will have one or multiple associated codes and time slots assigned to it. The use of one code in one time slot is referred to as a resource unit.

Since multiple communications may be sent in the same frequency spectrum and at the same time, a receiver in such a system must distinguish between the multiple communications. One approach to detecting such signals is joint detection. In joint detection, signals associated with all the UEs 14, users, are detected simultaneously. Approaches for joint detection include zero forcing block linear equalizers (ZF-BLE) and minimum mean square error (MMSE) BLE. The methods to realize ZF-BLE or MMSE-BLE include Cholesky decomposition based and fast Fourier transform (FFT) based approaches. These approaches have a high complexity. The high complexity leads to increased power consumption, which at the UE 14 results in reduced battery life. Accordingly, it is desirable to have alternate approaches to detecting received data.

SUMMARY

Data is estimated of a plurality of received spread spectrum signals. The plurality of received communications are received in a shared spectrum. The received communications are sampled to produce a received vector. The received vector is processed to produce a plurality of segments. Each segment is processed separately to estimate data of the received communications.

BRIEF DESCRIPTION OF THE DRAWING(S)

FIG. 2 is an illustration of a transmitter and a segment-wise channel equalization data detection receiver.

FIG. 3 is an illustration of a communication burst and segmentation of data fields of the communication burst.

DETAILED DESCRIPTION OF THE PREFERRED EMBODIMENT(S)

Figure 1:
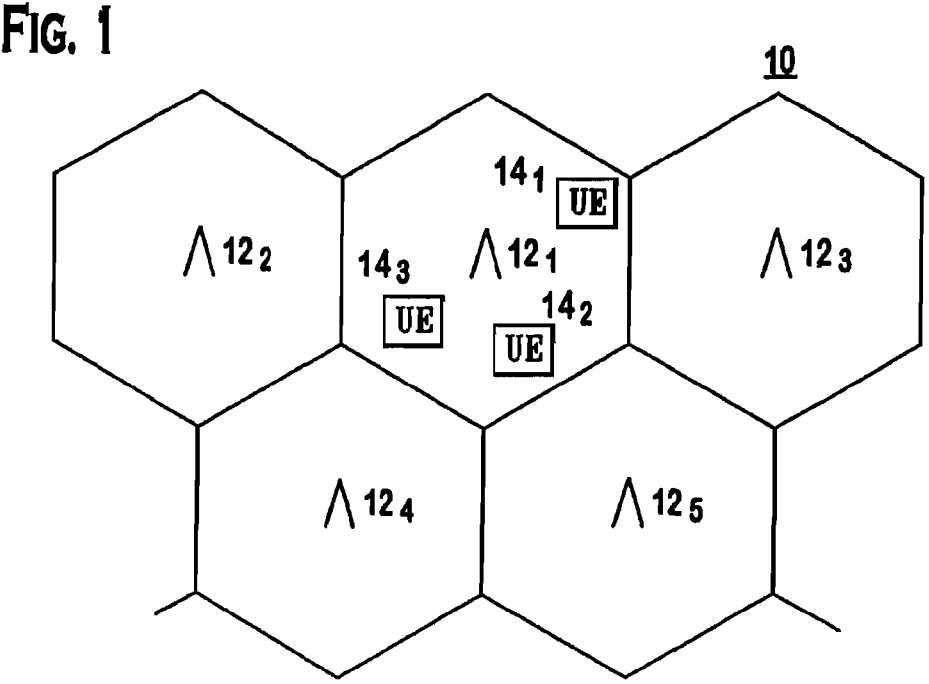
FIG. 1 is an illustration of a wireless spread spectrum communication system.

FIG. 2 illustrates a simplified transmitter 26 and receiver 28 using a segment-wise channel equalization based data estimation in a TDD/CDMA communication system, although segment-wise channel equalization is applicable to other systems, such as frequency division duplex (FDD) CDMA or other hybrid time division multiple access (TDMA)/CDMA systems. In a typical system, a transmitter 26 is in each UE 14 and multiple transmitting circuits 26 sending multiple communications are in each base station 12. The segment-wise channel equalization receiver 28 may be at a base station 12, UEs 14 or both.

The transmitter 26 sends data over a wireless radio channel 30. A data generator 32 in the transmitter 26 generates data to be communicated to the receiver 28. A modulation and spreading device 34 spreads the data and makes the spread reference data time-multiplexed with a midamble training sequence in the appropriate assigned time slot and codes for spreading the data, producing a communication burst or bursts.

A typical communication burst 16 has a midamble 20, a guard period 18 and two data fields 22, 24, as shown in FIG. 3. The midamble 20 separates the two data fields 22, 24 and the guard period 18 separates the communication bursts to allow for the difference in arrival times of bursts transmitted from different transmitters 26. The two data fields 22, 24 contain the communication burst's data.

The communication burst(s) are modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as quadrature phase shift keying (QPSK) or M-ary quadrature amplitude modulation (QAM).

The antenna 40 of the receiver 28 receives various radio frequency signals. The received signals are demodulated by a demodulator 42 to produce a baseband signal. The baseband signal is sampled by a sampling device 43, such as one or multiple analog to digital converters, at the chip rate or a multiple of the chip rate of the transmitted bursts to produce a received vector, r. The samples are processed, such as by a channel estimation device 44 and a segment-wise channel equalization data detection device 46, in the time slot and with the appropriate codes assigned to the received bursts. The channel estimation device 44 uses the midamble training sequence component in the baseband samples to provide channel information, such as channel impulse responses. The channel impulse responses can be viewed as a matrix, H. The channel information and spreading codes used by the transmitter are used by the segment-wise channel equalization data detection device 46 to estimate the transmitted data of the received communication bursts as soft symbols, d.

Although segment-wise channel equalization is explained using the third generation partnership project (3GPP) universal terrestrial radio access (UTRA) TDD system as the underlying communication system, it is applicable to other systems. That system is a direct sequence wideband CDMA (W-CDMA) system, where the uplink and downlink transmissions are confined to mutually exclusive time slots.

The received communications can be viewed as a signal model per Equation 1.

$$\underline{r} = H\underline{s} + \underline{n} \qquad \text{Equation 1}$$

r is the received vector. H is the channel response matrix. n is the noise vector. s is the spread data vector, which is the convolution of the spreading codes, C, and the data vector, d, as per Equation 2.

$$\underline{s} = C\underline{d} \qquad \text{Equation 2}$$

Figure 4:
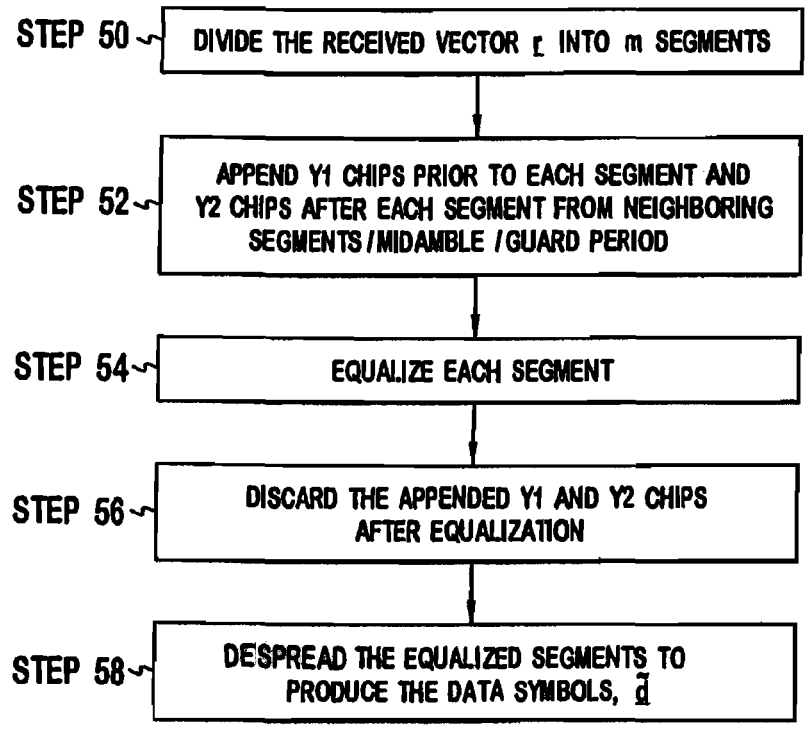
FIG. 4 is a flow chart of a segment-wise channel equalization data detection receiver.

Segment-wise channel equalization divides the received vector, r, into segments of sequential samples, as illustrated in FIG. 3, and processes each segment separately as shown in FIG. 4, step 50. FIG. 3 also illustrates segmentation of a communication burst and illustrates how each segment represents a continuous portion of the received vector. Each data field of the burst is N chips in length. The data fields are divided into M segments $48_{11}$-$48_{1M}$, $48_{21}$-$48_{2M}$ (48). The following discussion uses a uniform segment length Y for each segment 48, although the segments 48 based on the exact implementation may be of differing lengths. Prior to processing each segment 48, Y1 chips prior to each segment are appended to the segment and Y2 chips after each segment 48 are appended to the segment 48, step 52. In general, the resulting length of each processed segment 48 is Z=Y+Y1+Y2.

Preferably, both Y1 and Y2 are at least the length of the impulse response W less one chip (W−1). The last chip's impulse response in each segment extends by W−1 chips into the next segment. Conversely, the furthest chip's impulse response prior to a segment that extends into that segment is W−1 chips ahead of the segment. Using W−1 chips prior to the segment allows all the influence of all of the prior chips to be equalized out of the desired segment. Using W−1 chips after the segment allows all the information (impulse response) for each chip of the segment extending into the next segment to be used in the data detection. It may be desirable to have Y1 or Y2 be longer than W−1 to facilitate a specific implementation of segment-wise channel equalization. To illustrate, the length of Y1 and Y2 may be extended so that a convenient length for a prime factor algorithm fast Fourier transform can be utilized. This may also be accomplished by padding, such as by zero padding the extended positions.

Using the M extended segments, Equation 1 is rewritten as Equation 3 for each segment.

$$\underline{r}_i = H_s \underline{s}_i + \underline{n}_i, \text{ where } i=1,\ldots,M \qquad \text{Equation 3}$$

$H_s$ is the channel response matrix corresponding to the segment. If each segment is of equal length, $H_s$ is typically the same for each segment.

Two approaches to solve Equation 3 use an equalization stage followed by a despreading stage. Each received vector segment, $\underline{r}_i$, is equalized, step 54. One equalization approach uses a minimum mean square error (MMSE) solution. The MMSE solution for each extended segment is per Equation 4.

$$\hat{\underline{s}}_i = (H_s^H H_s + \sigma^2 I_s)^{-1} H_s^H \underline{r}_i \qquad \text{Equation 4}$$

$\sigma^2$ is the noise variance and $I_s$ is the identity matrix for the extended matrix. $(.)^H$ is the complex conjugate transpose operation or Hermitian operation. Alternately, Equation 4 is written as Equation 5.

$$\hat{\underline{s}}_i = R_s^{-1} H_s^H \underline{r}_i \qquad \text{Equation 5}$$

$R_s$ is defined per Equation 6.

$$R_s = H_s^H H_s + \sigma^2 I_s \qquad \text{Equation}$$

Using either Equation 4 or 5, an MMSE equalization of each segment is obtained.

One approach to solve Equation 6 is by a fast Fourier transform (FFT) as per Equations 7 and 8.

$$R_s = D_z^{-1} \Lambda D_z = (1/P) D_z^* \Lambda D_z \qquad \text{Equation 7}$$

$$R_s^{-1} = D_z^{-1} \Lambda^{-1} D_z = (1/P) D_z^* \Lambda^* D_z \qquad \text{Equation 8}$$

$D_z$ is the Z-point FFT matrix and $\Lambda$ is the diagonal matrix, which has diagonals that are an FFT of the first column of a circulant approximation of the $R_s$ matrix. The circulant approximation can be performed using any column of the $R_s$ matrix. Preferably, a full column, having the most number of elements, is used.

In the frequency domain, the FFT solution is per Equation 9.

$$F(\hat{\underline{s}}) = \frac{\sum_{m=1}^{M} F(\underline{h}_m)^* \otimes F(\underline{r}_m)}{F(\underline{q})} \qquad \text{Equation 9}$$

where $$F(x) = \sum_{n=0}^{P-1} x(n) e^{-j\frac{2\pi k n}{N}}, \text{ where } k = 0, 1, \ldots, P-1$$

$\otimes$ is the Kronecker product. M is the sampling rate. M=1 is chip rate sampling and M=2 is twice the chip rate sampling.

After the Fourier transform of the spread data vector, $F(\hat{\underline{s}})$, is determined, the spread data vector $\hat{\underline{s}}$ is determined by taking an inverse Fourier transform. A second approach to solve Equation 6 is by Cholesky or approximate Cholesky decomposition.

Another solution for the equalization stage other than MMSE is a least squares error (LSE) solution. The LSE solution for each extended segment is per Equation 10.

$$\hat{\underline{s}}_i = (H_s^H H_s)^{-1} H_s^H \underline{r}_i \qquad \text{Equation 10}$$

After equalization, the first Y1 and the last Y2 chips are discarded, step 56. As a result, $\hat{\underline{s}}_i$ becomes $\tilde{\underline{s}}_i$. $\tilde{\underline{s}}_i$ is of length Y. To produce the data symbols $\underline{\tilde{d}}_i \tilde{\underline{s}}_i$ is despread per Equation 11, step 58.

$$\underline{\tilde{d}}_i = C_s^H \tilde{\underline{s}}_i \qquad \text{Equation 11}$$

$C_s$ is the portion of the channel codes corresponding to that segment.

Alternately, the segments are recombined into an equalized spread data field $\tilde{\underline{s}}$ and the entire spread data field is despread per Equation 12, step 58.

$$\underline{\tilde{d}} = C^H \tilde{\underline{s}} \qquad \text{Equation 12}$$

Although segment-wise channel equalization based data estimation was explained in the context of a typical TDD burst, it can be applied to other spread spectrum systems. To illustrate for an FDD/CDMA system, an FDD/CDMA system receives communications over long time periods. As the receiver 28 receives the FDD/CDMA communications, the receiver 28 divides the samples into segments $\hat{\underline{s}}_i$ and segment-wise channel equalization is applied.

By breaking the received vector, r, into segments prior to processing, the complexity for the data detection is reduced. To illustrate the complexity reduction, a data field of a TDD burst having 1024 chips (N=1024) is used. Four different scenarios using an FFT/MMSE approach to equalization are compared: a first scenario processes the entire data field of length 1024, a second scenario divides the entire data field into two segments of length 512, a third scenario divides the entire data field into four segments of length 256 and a fourth scenario divides the entire data field into eight segments of length 128. For simplicity, no overlap between the segments was assumed for the comparison. In practice due to the overlap, the complexity for the segmented approaches is slightly larger than indicated in the following tables.

Table 1 illustrates the number of complex operations required to perform the data detection using Radix-2 FFTs. The table shows the number of Radix-2 and direct multiple operations required for each scenario.

TABLE 1

| Number of Complex Operations | One Segment | Two Segments | Three Segments | Four Segments |
|---|---|---|---|---|
| Radix-2 | 1024 | 9216 | 8192 | 7168 |
| Direct Multiply | 1049K | 524K | 262K | 131K |

Table 2 compares the percentage of complexity of each scenario using one segment as 100% complexity. The percentage of complexity is show for both Radix-2 and direct multiple operations.

TABLE 2

| % Complexity | One Segment | Two Segments | Three Segments | Four Segments |
|---|---|---|---|---|
| Radix-2 | 100% | 90% | 80% | 70% |
| Direct Multiply | 100% | 50% | 25% | 12.5% |

For chip rate sampling, one F(h), one F(q), two F(r) and two inverse FFTs are performed for each segment. For twice the chip rate sampling, two F(h), one F(q), four F(r) and two inverse FFTs are performed for each segment. Table 3 illustrates the complexity of Radix-2 operations at both the chip rate and twice the chip rate.

TABLE 3

| Number of Complex Operations | One Segment | Two Segments | Three Segments | Four Segments |
|---|---|---|---|---|
| Radix-2 (Chip Rate) | 60K | 45K | 36K | 30K |
| Radix-2 (Twice Chip Rate) | 90K | 68K | 54K | 45K |

Table 4 shows the total complexity as a percentage for the Radix-2 operations for both chip rate and twice chip rate sampling.

TABLE 4

| % Complexity | One Segment | Two Segments | Three Segments | Four Segments |
|---|---|---|---|---|
| Radix-2 (Chip Rate) | 100% | 75% | 60% | 50% |
| Radix-2 (Twice Chip Rate) | 100% | 76% | 60% | 50% |

As shown by the tables, in general, as the number of segments increases, the overall complexity decreases. However, if the size of the segments is decreased too far, such as to the length of the impulse response, due to the overlap between segments, the complexity increases.

To illustrate segment-wise channel equalization in a practical system, a TDD burst type 2 is used. A similar segmentations can be used for other bursts, such as a burst type 1. A TDD burst type 2 has two data fields of length 1104 (N=1104). The channel response for these illustrations is of length 63 chips (W=63). Y1 and Y2 are set to W−1 or 62 chips. The following are three potential segmentations, although other segmentations may be used.

The first segmentation divides each data field into two segments of length 552. With overlap between the segments, each segment is of length 676 (Y+Y1+Y2). The second segmentation divides each data field into three segments of length 368. With overlap between the segments, each segment is of length 492 (Y+Y1+Y2). The third segmentation divides each data field into four segments of length 184. With overlap between the segments, each segment is of length 308 (Y+Y1+Y2).

What is claimed is:

1. A method for estimating data comprising:
   receiving a plurality of spread spectrum communication signals carrying data;
   sampling the received communication signals to produce a received vector;
   segmenting the received vector into a series of segments;
   extending each segment to produce an extended segment that comprises the segment and a neighboring segment portion of a neighboring segment within the series of segments; and
   processing each extended segment separately to estimate data of the received communication signals.

2. The method of claim 1 wherein the processing each extended segment comprises:
   equalizing each extended segment;
   for each equalized extended segment, extracting an equalized segment by discarding any portion corresponding to an extension portion of the respective extended segment; and
   despreading the equalized segments.

3. The method of claim 2 wherein the despreading the equalized segments comprises combining the equalized segments and despreading the equalized combined segments to recover data of the received vector.

4. The method of claim 1 wherein extended segments are produced that comprise the respective segment and a neighboring segment portion of each neighboring segment such that segments that have two neighboring segments within the series of segments are extended by appending a first neighboring segment portion to one end of the respective segment and a second neighboring segment portion to an opposite end of the segment.

5. The method of claim 4 wherein the processing each extended segment comprises:
   equalizing each extended segment;
   for each equalized extended segment, extracting an equalized segment by discarding any portion corresponding to an extension portion of the respective extended segment; and
   despreading the equalized segments.

6. The method of claim 5 wherein the despreading the equalized segments comprises combining the equalized segments and despreading the equalized combined segments to recover data of the received vector.

7. The method of claim 5 wherein the equalizing each extended segment comprises at least one of the following:

using a minimum mean square error model;
solving a minimum mean square error model using fast Fourier transforms;
solving a minimum mean square error model using Cholesky decomposition;
solving a minimum mean square error model using approximate Cholesky decomposition; and
using a least squares error model.

8. The method of claim 4 wherein segments are produced that each have a length greater than a length of an impulse response and extended segments are produced where each neighboring segment portion of a neighboring segment included in the extended segment has a length of at least the length of the impulse response less one chip.

9. The method of claim 1 wherein segments are produced that each have a length greater than a length of an impulse response and extended segments are produced that each have a neighboring segment portion of a neighboring segment that has a length of at least the length of the impulse response less one chip.

10. A wireless communication apparatus:
a receiver configured to receive a plurality of spread spectrum communication signals in a shared spectrum;
a sampling device configured to sample the received communication signals to produce a received vector of sequential samples;
a segment-wise channel equalization data detection device configured to segment the received vector into a series of segments;
the segment-wise channel equalization data detection device configured to extend each segment to produce an extended segment that comprises the segment and a neighboring segment portion of a neighboring segment within the series of segments; and
the segment-wise channel equalization data detection device configured to process each extended segment separately to estimate data of the received communication signals.

11. The wireless communication apparatus of claim 10 wherein the segment-wise channel equalization data detection device is configured to equalize each extended segment, extract an equalized segment from each equalized extended segment by discarding any portion corresponding to an extension portion of the respective extended segment, and despread the equalized segments.

12. The wireless communication apparatus of claim 11 wherein the segment-wise channel equalization data detection device is configured to despread the equalized segments by combining the equalized segments and despreading the equalized combined segments to recover data of the received vector.

13. The wireless communication apparatus of claim 10 wherein the segment-wise channel equalization data detection device is configured to produce extended segments that comprise the respective segment and a neighboring segment portion of each neighboring segment such that segments that have two neighboring segments within the series of segments are extended by appending a first neighboring segment portion to one end of the respective segment and a second neighboring segment portion to an opposite end of the segment.

14. The wireless communication apparatus of claim 13 wherein the segment-wise channel equalization data detection device is configured to equalize each extended segment, extract an equalized segment from each equalized extended segment by discarding any portion corresponding to an extension portion of the respective extended segment, and despread the equalized segments.

15. The wireless communication apparatus of claim 14 wherein the segment-wise channel equalization data detection device is configured to despread the equalized segments by combining the equalized segments and despreading the equalized combined segments to recover data of the received vector.

16. The wireless communication apparatus of claim 14 wherein the segment-wise channel equalization data detection device includes at least one of the following segment equalizing components:
a component configured to use a minimum mean square error model for equalizing each extended segment;
a component configured to equalize each extended segment by solving a minimum mean square error model using fast Fourier transforms;
a component configured to equalize each extended segment by solving a minimum mean square error model using Cholesky decomposition;
a component configured to equalize each extended segment by solving a minimum mean square error model using approximate Cholesky decomposition; and
a component configured to equalize each extended segment by using a least squares error model.

17. The wireless communication apparatus of claim 13 wherein the segment-wise channel equalization data detection device is configured to produce segments that each have a length greater than a length of an impulse response and to produce extended segments where each neighboring segment portion of a neighboring segment included in the extended segment has a length of at least the length of the impulse response less one chip.

18. The wireless communication apparatus of claim 10 wherein the segment-wise channel equalization data detection device is configured to produce segments that each have a length greater than a length of an impulse response and to produce extended segments where each neighboring segment portion of a neighboring segment included in the extended segment has a length of at least the length of the impulse response less one chip.

19. A base station comprising the wireless communication apparatus of claim 10.

20. A user equipment comprising the wireless communication apparatus of claim 10.

* * * * *